(12) United States Patent
Namihisa et al.

(10) Patent No.: US 11,170,823 B1
(45) Date of Patent: Nov. 9, 2021

(54) TAPE EMBEDDED DRIVE WITH MULTIPLE FEEDTHROUGH CONNECTIONS

(71) Applicant: Western Digital Technologies, Inc., San Jose, CA (US)

(72) Inventors: Miki Namihisa, Kanagawa (JP); Kouki Uefune, Kanagawa (JP); Toshio Takahashi, Tokyo (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/897,151

(22) Filed: Jun. 9, 2020

(51) Int. Cl.
*G11B 33/12* (2006.01)
*G11B 15/60* (2006.01)
*G11B 5/008* (2006.01)
*G11B 33/02* (2006.01)

(52) U.S. Cl.
CPC ........ *G11B 33/122* (2013.01); *G11B 5/00813* (2013.01); *G11B 15/60* (2013.01); *G11B 33/02* (2013.01)

(58) Field of Classification Search
None
See application file for complete search history.

(56) References Cited

U.S. PATENT DOCUMENTS

| | | |
|---|---|---|
| 2,578,221 A | 12/1951 | Bodmer |
| 3,168,232 A | 2/1965 | Beaver |
| 3,176,927 A | 4/1965 | Irazoqui |
| 3,667,701 A | 6/1972 | Blum |
| 3,692,956 A | 9/1972 | Northrup |
| 3,987,980 A | 10/1976 | Sperry |
| 4,009,846 A | 3/1977 | Coruzzi |
| 4,080,638 A | 3/1978 | Platt |
| 4,266,255 A | 5/1981 | Camras |
| 4,303,210 A | 12/1981 | Fujita et al. |
| 4,562,497 A | 12/1985 | Morinaga et al. |
| 4,575,022 A | 3/1986 | Allwine, Jr. et al. |
| 5,055,947 A | 10/1991 | Satoh |
| 5,372,264 A | 12/1994 | Rudi et al. |
| 5,543,992 A | 8/1996 | Hu et al. |
| 5,790,343 A | 8/1998 | Takano et al. |

(Continued)

FOREIGN PATENT DOCUMENTS

| | | |
|---|---|---|
| CA | 1257387 A | 7/1989 |
| CN | 1497597 A | 5/2004 |
| JP | H10241340 A | 9/1998 |

OTHER PUBLICATIONS

Kobayashi, U.S. Appl. No. 16/365,034, filed Mar. 26, 2019.

(Continued)

*Primary Examiner* — Craig A. Renner
(74) *Attorney, Agent, or Firm* — Patterson & Sheridan, LLP; Steven H. Versteeg

(57) ABSTRACT

The present disclosure generally relates to a tape embedded drive having a plurality of feedthrough connectors. The feedthrough connectors are symmetrically placed within the tape embedded drive such that regardless of whether an even or odd number of feedthrough connectors are present, the feedthrough connectors are symmetrical about a centerline of the tape embedded drive. In such a layout, the tape embedded drive is more stable due to symmetrical mass balance. Additionally, the tape embedded drive is more cost effective to produce.

22 Claims, 11 Drawing Sheets

(56) References Cited

U.S. PATENT DOCUMENTS

| | | | |
|---|---|---|---|
| 5,881,960 | A | 3/1999 | Christie |
| 5,883,771 | A | 3/1999 | Hoerger |
| 5,982,592 | A | 11/1999 | Saito et al. |
| 6,163,432 | A | 12/2000 | Van Den Dungen |
| 6,341,068 | B1 | 1/2002 | Bradley et al. |
| 6,466,400 | B1 | 10/2002 | Iwahara et al. |
| 8,616,900 | B1 | 12/2013 | Lion |
| 9,824,715 | B2 | 11/2017 | Vanderheyden |
| 9,892,751 | B1 | 2/2018 | Harper |
| 10,971,184 | B1 * | 4/2021 | Chew .................. G11B 15/32 |
| 11,081,132 | B1 * | 8/2021 | Chew ................ G11B 5/00817 |
| 2004/0004789 | A1 | 1/2004 | Watanabe et al. |
| 2004/0190216 | A1 | 9/2004 | Yip et al. |
| 2007/0008683 | A1 | 1/2007 | Gavit et al. |
| 2007/0236827 | A1 | 10/2007 | Eaton et al. |
| 2008/0198506 | A1 | 8/2008 | Weng et al. |
| 2009/0316299 | A1 | 12/2009 | Tashiro et al. |
| 2012/0206832 | A1 | 8/2012 | Hamidi et al. |
| 2013/0019465 | A1 | 1/2013 | Childers et al. |
| 2013/0050872 | A1 | 2/2013 | Sekii et al. |
| 2015/0310881 | A1 | 10/2015 | Koui |
| 2016/0104515 | A1 | 4/2016 | Strange |

OTHER PUBLICATIONS

Tape Drives and Media, LTO Drive Requirements and Compatibility; https://qsupport.quantum.com/kb/flare/content/Scalar_i6000/docCenter/, 2020, (2 pages).

* cited by examiner

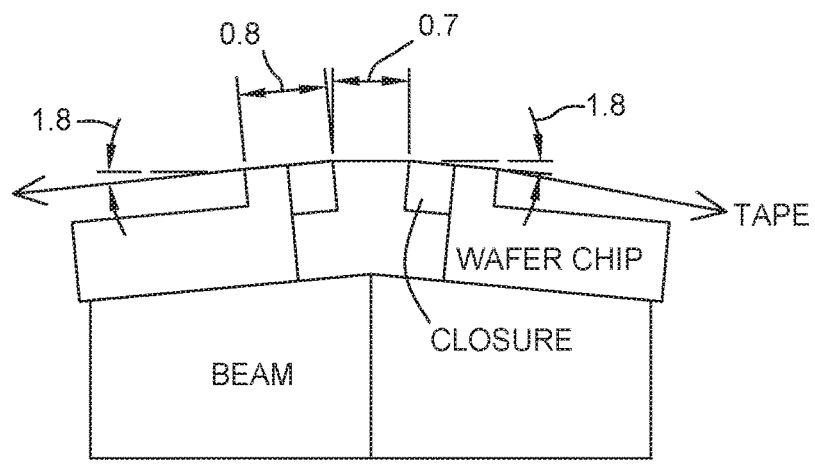
FIG. 5A
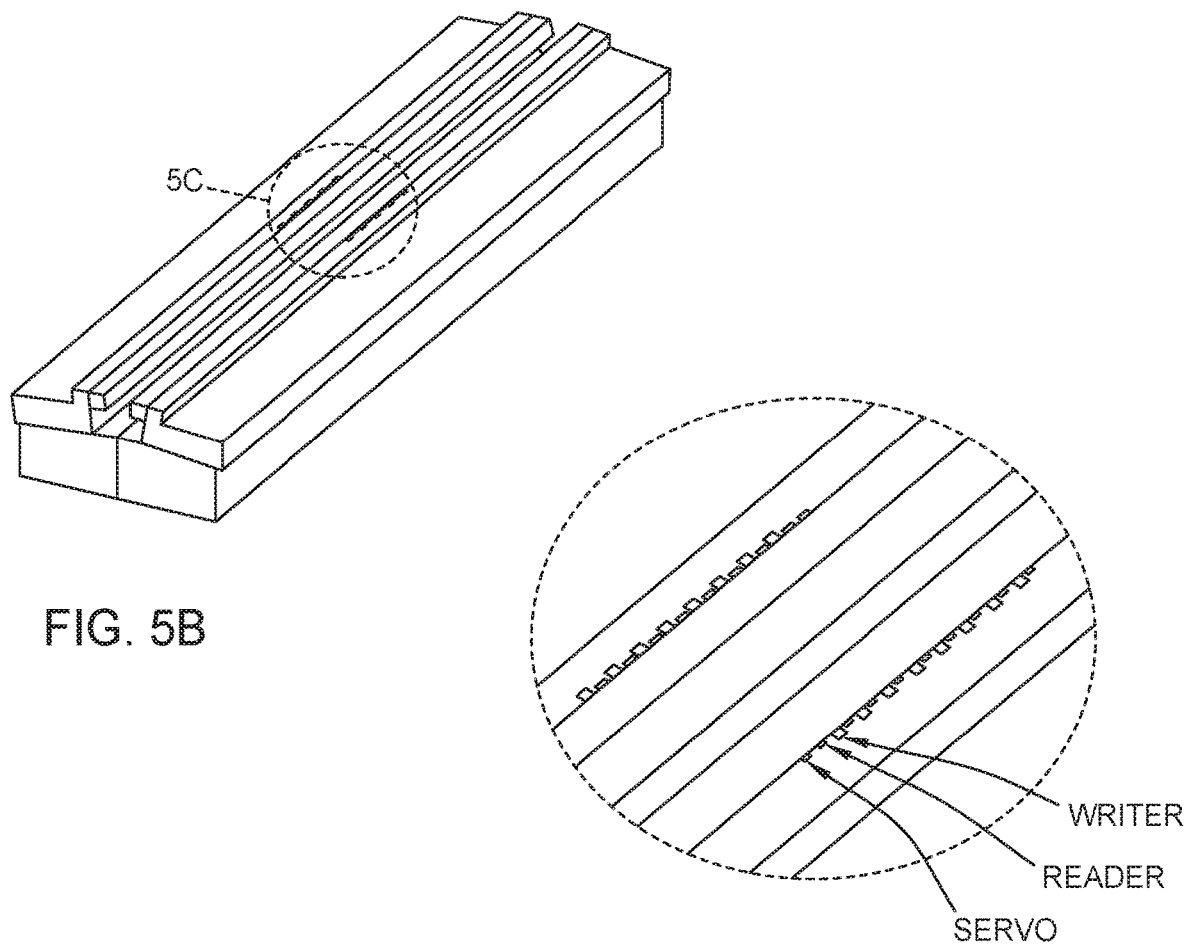
FIG. 5B
FIG. 5C

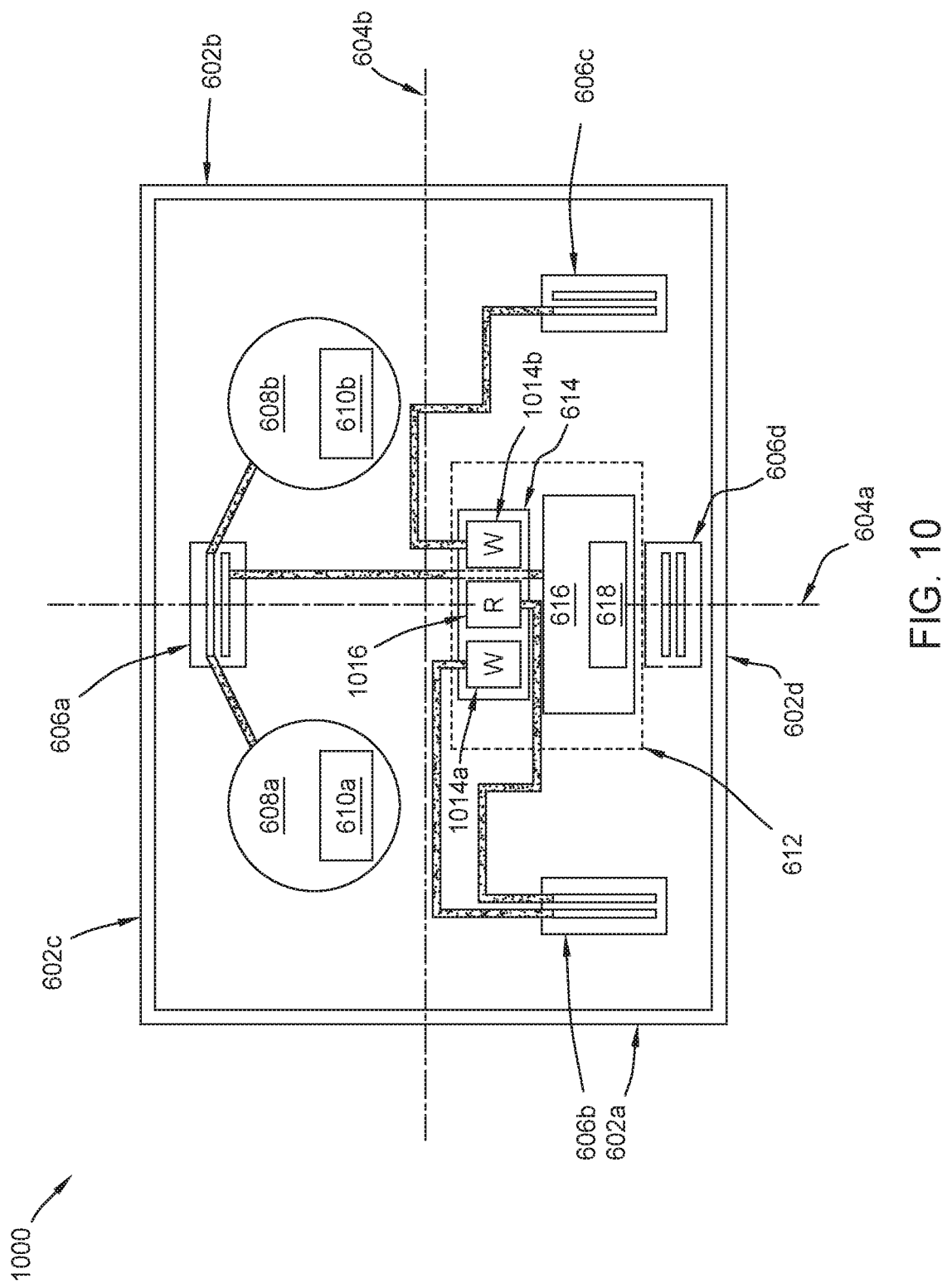

TAPE EMBEDDED DRIVE WITH MULTIPLE FEEDTHROUGH CONNECTIONS

BACKGROUND OF THE DISCLOSURE

Field of the Disclosure

Embodiments of the present disclosure generally relate to feedthrough connections for a tape embedded drive.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

Tape drives have numerous data read/write head elements on a single tape head, such as 32 data read/write head elements and 2 servo read elements. Additionally, the tape head has numerous positioning motors as well as various sensors. The motors, sensors and head elements all need to be connected to a printed circuit board assembly (PCBA) through feedthrough connectors. To accommodate so many elements, sensors, and motors, multiple feedthrough connectors are necessary.

Therefore, there is a need in the art for an improved tape drive that has a plurality of feedthrough connectors.

SUMMARY OF THE DISCLOSURE

The present disclosure generally relates to a tape embedded drive having a plurality of feedthrough connectors. The feedthrough connectors are symmetrically placed within the tape embedded drive such that regardless of whether an even or odd number of feedthrough connectors are present, the feedthrough connectors are symmetrical about a centerline of the tape embedded drive. In such a layout, the tape embedded drive is more stable due to symmetrical mass balance. Additionally, the tape embedded drive is more cost effective to produce.

In one embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure; and a plurality of feedthrough connectors coupled to the bottom surface, wherein the plurality of feedthrough connectors are symmetrically arranged around a hypothetical centerline that is parallel to the first wall and the second wall.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure; a first feedthrough connector coupled to the bottom surface, wherein the first feedthrough connector is centered on a hypothetical centerline that is parallel to the first wall and the second wall; a second feedthrough connector coupled to the bottom surface, wherein the second feedthrough connector is spaced from the hypothetical centerline; and a third feedthrough connector coupled to the bottom surface, wherein the third feedthrough connector is spaced from the hypothetical centerline.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure, the tape head comprising a beam, a first write head bar, a read bar, and a second write head bar; head positioning motors coupled to the tape head; a first feedthrough connector coupled to the bottom surface and the head positioning motors, wherein the first feedthrough connector is centered on a hypothetical centerline that is parallel to the first wall and the second wall; a second feedthrough connector coupled to the bottom surface and either the first write head or the second write head; and a third feedthrough connector coupled to the bottom surface and either the first write head or the second write head.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5C are schematic illustrations of a tape head according to various embodiments.

FIG. 10 is a schematic illustration of a tape embedded drive having a plurality of feedthrough connectors according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape embedded drive having a plurality of feedthrough connectors. The feedthrough connectors are symmetrically placed within the tape embedded drive such that regardless of whether an even or odd number of feedthrough connectors are present, the feedthrough connectors are symmetrical about a centerline of the tape embedded drive. In such a layout, the tape embedded drive is more stable due to symmetrical mass balance. Additionally, the tape embedded drive is more cost effective to produce.

Figure 1A:
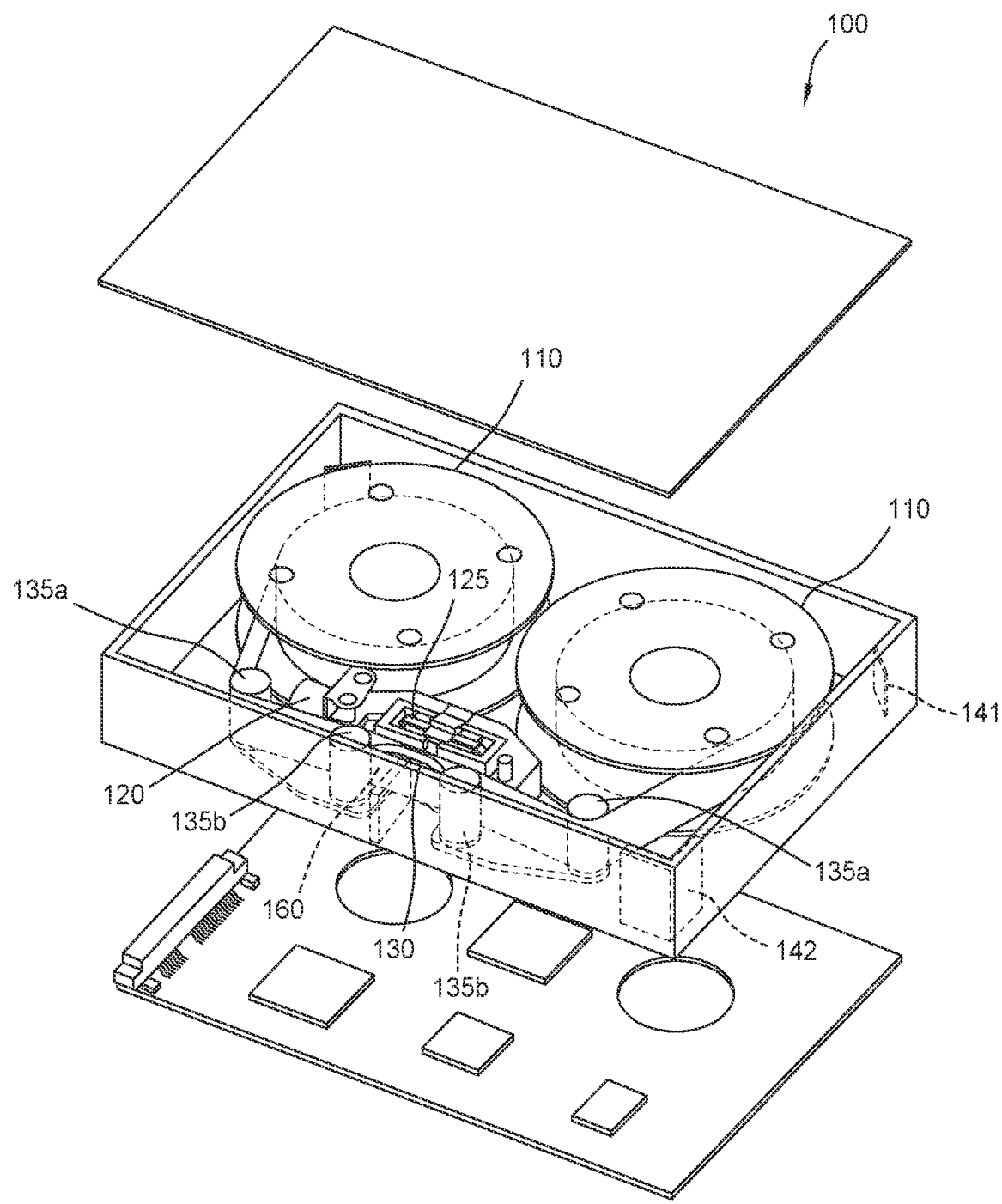
FIGS. 1A-1C illustrate a perspective exploded view and a simplified top down and side profile view of a tape embedded drive, in accordance with some embodiments.
Figure 1B:
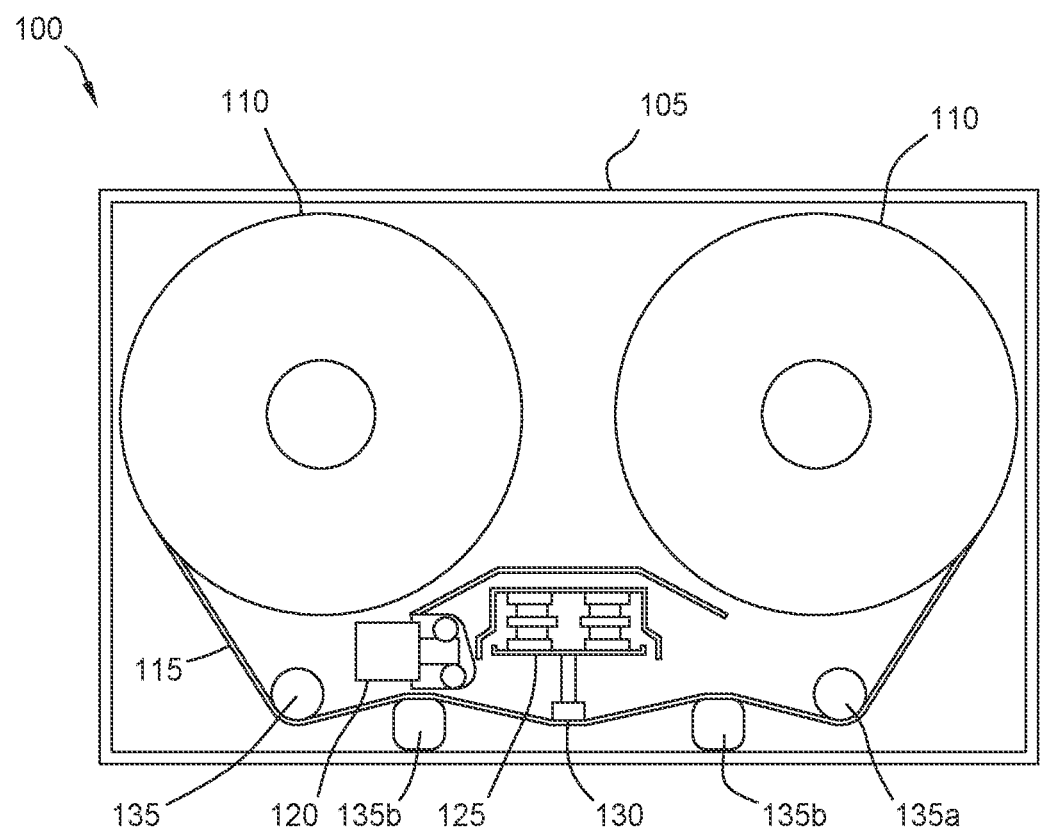
Figure 1C:
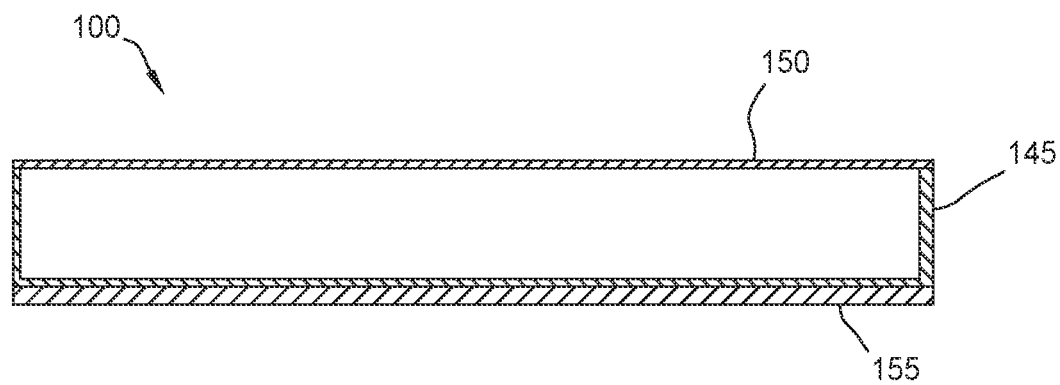

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more rotors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
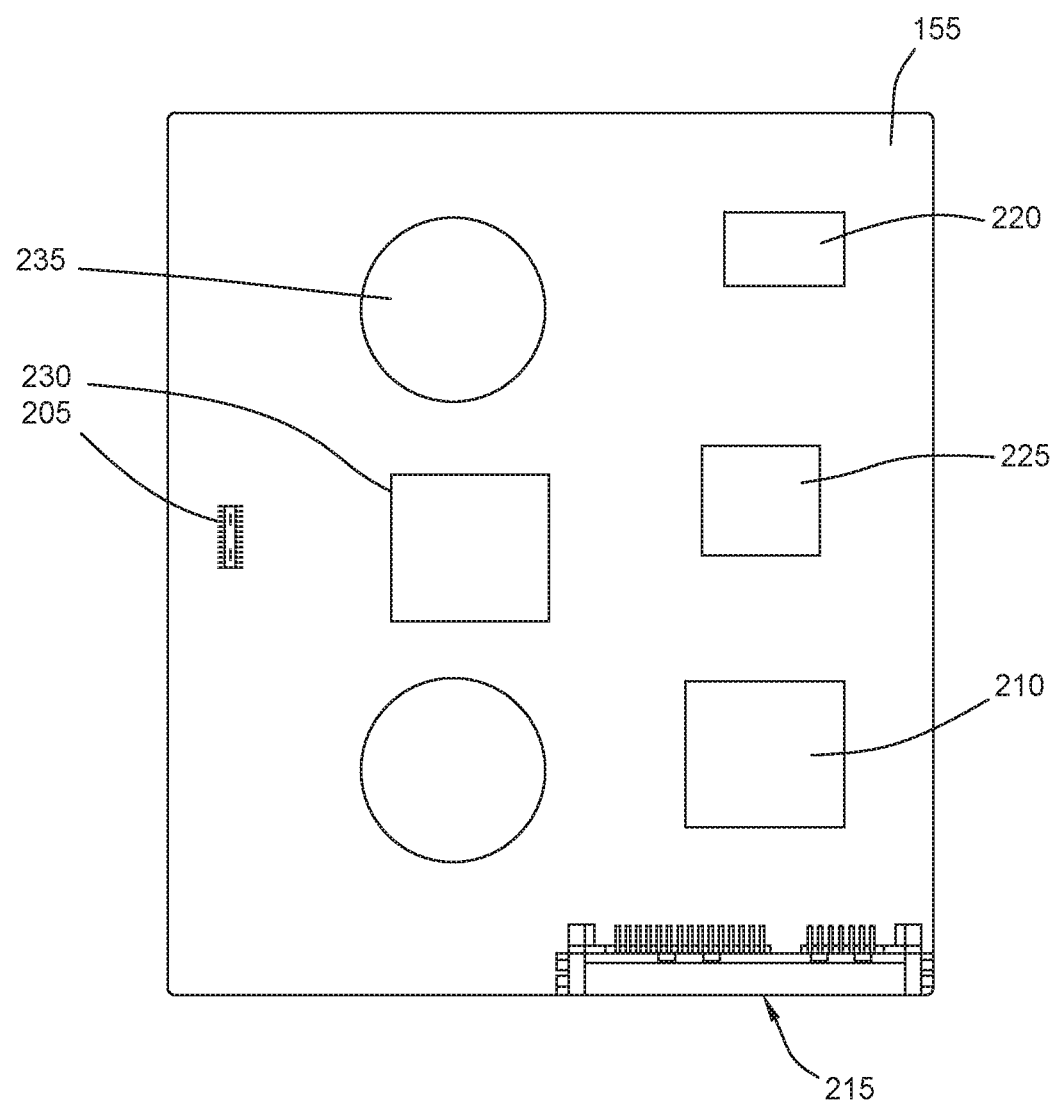
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

Figure 3:
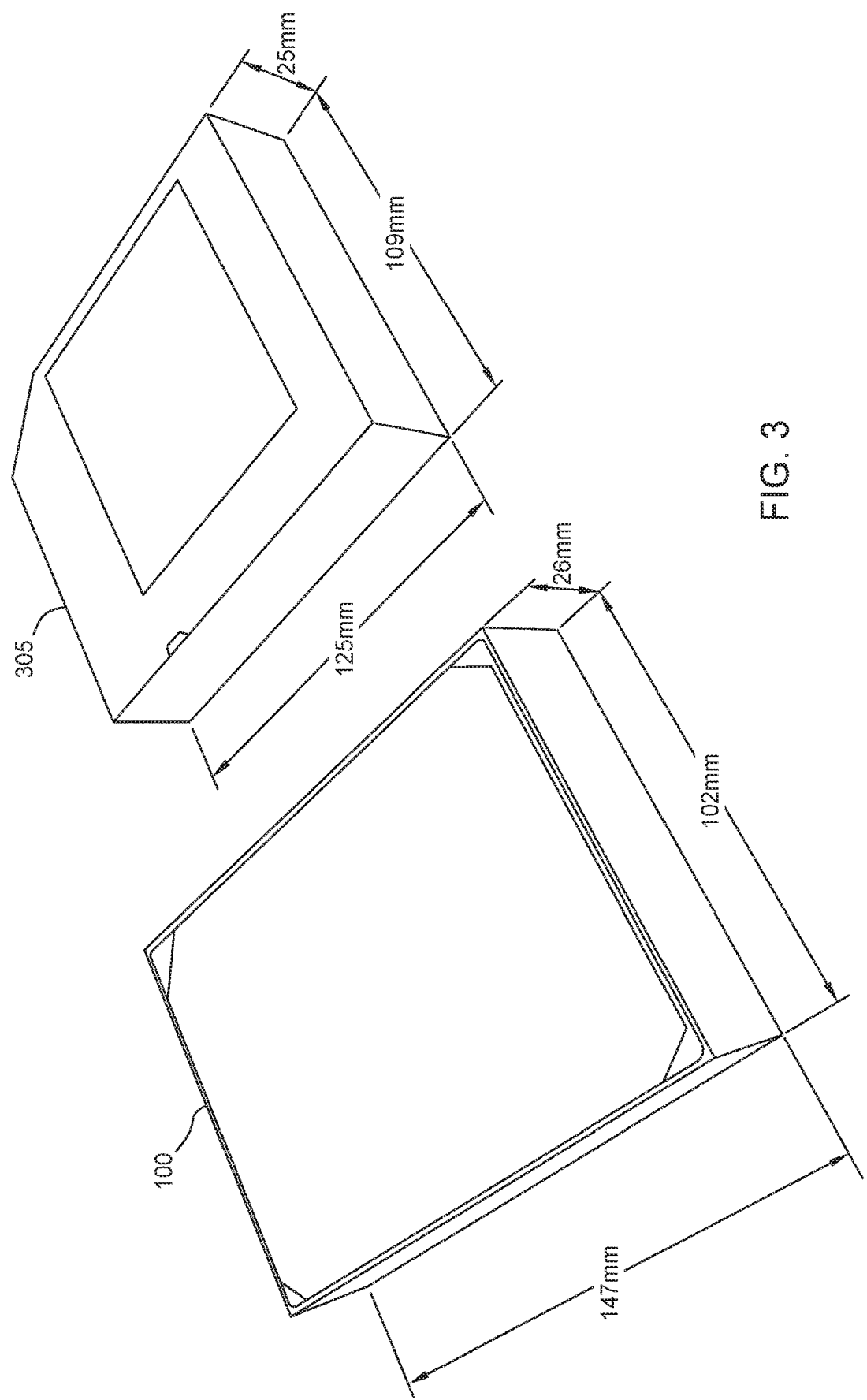
FIG. 3 illustrates a perspective view of a 3.5 inch form factor tape embedded drive and a linear tape-open (LTO) tape cassette, in accordance with some embodiments.

FIG. 3 illustrates a perspective view of a 3.5 inch form factor tape embedded drive 100 and a linear tape-open (LTO) tape cassette 305, in accordance with some embodiments. In one embodiment, the tape embedded drive 100 has a length of about 147 mm, a width of about 102 mm, and a height of about 26 mm. An LTO cassette 305 has dimension of a length of about 125 mm, a width of about 109 mm, and a height of about 25 mm. While the above discusses one set of possible dimensions for the tape embedded drive, other embodiments may have different dimensions. For example, the height may be doubled or otherwise increased (e.g., to about 52 mm) to allow larger tape film with a larger data capacity to be used.

The size (length×width×height) of the tape embedded drive with PCBA may be optimized by access time and storage capacity. For faster access time, the tape film length may be shorter. Shorter tape film length may lead to shorter length and/or width of the casing for the tape embedded drive, but may potentially lead to reduced total data capacity. For increased data capacity, the casing may be lengthened in width and/or length to store longer total tape length, but may potentially lead to longer access times.

In some embodiments, the tape film width may be increased from the standard 12.65 mm used in LTO cassettes to a wider film. Increasing the tape width may increase capacity without necessarily having any or some effect on access time, as the overall tape length may stay the same.

In an LTO cassette, with a 7 m/s tape wind up and a tape length of 1098 m, the average seek time is about 1098/3/7 ~=52 s, assuming that a ⅓ length seek time represents average seek time. Assuming an average robotics handling speed in the library system of 50 s, then the total average data access time is about 100 seconds. In various embodiments of the tape embedded drive, in a 3.5 inch form factor, can have an access time of about 592/3/20 ~=10s for average seek time. With a shorter tape length and hence smaller tape mass, 10 m/s, 15 m/s and 20 m/s wind up could be achieved. The previous values listed are not intended to be limiting, but to provide examples of possible embodiments. Furthermore, there may be no or at least less backlash due to inertial rotation from each tape reel motor.

While the above discusses the tape embedded drive 10 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 4:
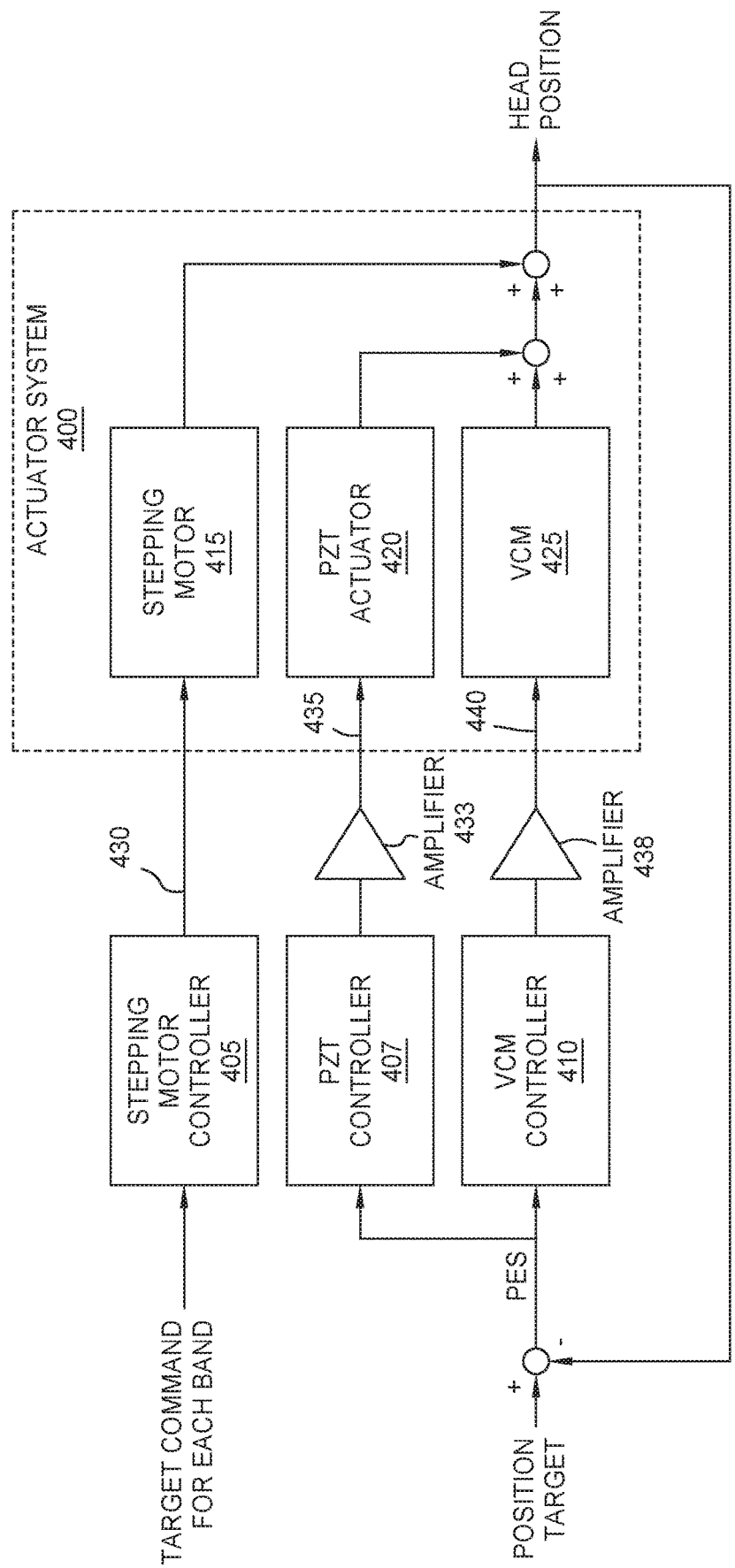
FIG. 4 illustrates a control block diagram for a servomechanical system of the tape embedded drive, in accordance with some embodiments.

FIG. 4 illustrates a control block diagram for a servo-mechanical system 400 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 405, a PZT controller 407, and a VCM controller 410 work together to control a stepping motor 415, a PZT actuator 420, and a VCM 425 to coordinate the movement of the head(s) in response to a target command.

As discussed above, the stepping motor 415 may provide coarse movement, the VCM 425 may provide fine movement, and the PZT actuator 420 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 430 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 433 may be positioned in between the PZT controller 407 and the PZT actuator 420 to amplify a second control signal 435. A second amplifier 438 may be positioned in between the VCM controller 410 and the VCM 425 to amplify a third control signal 440.

In an embodiment, the PZT actuator 420 and the VCM 425 move the head(s) serially. The VCM first moves the head(s) and then, if the head(s) are within a first threshold distance from the target position, the PZT actuator 420 may take over the movement of the head(s) for very fine movements. In another embodiment, the PZT actuator 420 and the VCM 425 may move the head(s) in parallel. It should be noted that although PZT is used throughout in the description of the control system of FIG. 4, as disclosed above, other types of actuators may be used in place of PZTs, and the system of FIG. 4 may be adapted accordingly in other embodiments.

FIGS. 5A and 5B are schematic illustrations of a tape head according to various embodiments. The tape head of FIGS. 5A and 5B may be the tape head of the head assembly 130 described in FIGS. 1A & 1B. FIG. 5A illustrates a cross-sectional view of the tape head in a writer-reader reader-writer (WR-RW) configuration. The tape head, on one side, comprises a beam to provide support to the wafer chip comprising a plurality of read heads and a plurality of write heads. The beam may have an angle, such that the read and write heads may have better contact with the tape film, such as the tape media 115 of FIGS. 1A & 1B, for the read and write operations. The wafer chip may further comprise one or more servo read elements.

FIG. 5B illustrates a tape head comprising multiple elements of FIG. 5A. The tape head may comprise about 32 or more data read/write head elements and about 2 servo read elements. The previously listed values are not intended to be limiting, but to provide an example of a possible embodiment. The plurality of tape head elements as well as the plurality of components on the PCBA, such as the PCBA 155 of FIG. 2, may require a plurality of circuit lines. The configuration of the plurality of circuit lines may require a plurality of feedthrough connectors, such that the circuit lines does not overload or exceed the capacity of a feedthrough connector. In one embodiment, the plurality of feedthrough connectors comprises three feedthrough connectors. In another embodiment, the plurality of feedthrough connectors comprises four feedthrough connectors. FIG. 5C illustrates a portion of the tape head of FIG. 5B, illustrating a close up view of data read/write head elements and the servo read elements.

Figure 6:
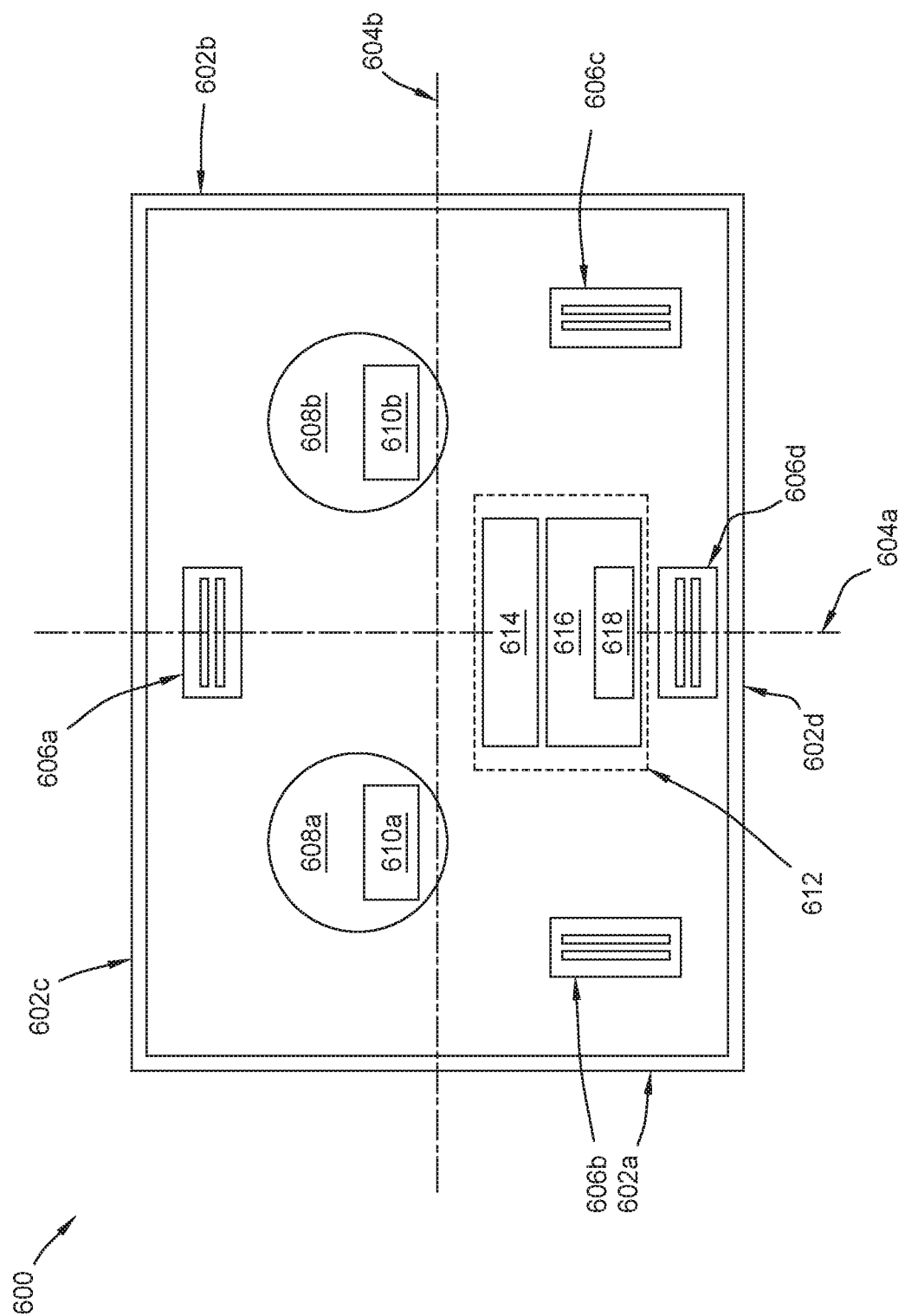
FIG. 6 is a schematic illustration of a tape embedded drive having a plurality of feedthrough connectors according to one embodiment.

FIG. 6 is a schematic illustration of a tape embedded drive 600 having a plurality of feedthrough connectors according to one embodiment. Aspects of the tape embedded drive 600 may be similar to the tape embedded drive 100 of FIG. 1A-1C. The tape embedded drive 600 comprises a first wall 602a and a second wall 602b, wherein the first wall 602a and the second wall 602b are parallel and have the same length. The end of the first wall 602a and the respective end of the second wall 602b are connected by a third wall 602c, wherein the third wall 602c is perpendicular to the first wall 602a and the second wall 602b. A fourth wall 602d is perpendicular to both the first wall 602a and the second wall 602b and parallel to the third wall 602c. The fourth wall 602d connects the first wall 602a and the second wall 602b at the opposite end of where the third wall 602c connects the first wall 602a and the second wall 602b. The third wall 602c and the fourth wall 602d are parallel and have the same length, wherein the length of the third wall 602c and the fourth wall 602d is greater than the length of the first wall 602a and the second wall 602b. The first wall 602a, second wall 602b, third wall 602c, and fourth wall 602d are arranged in the configuration above to create an enclosure (referred to as an enclosure 602 for the configurations of the walls described above) for the components of the tape embedded drive 600.

In the following embodiments, the tape embedded drive 600 comprises a first hypothetical line 604a and a second hypothetical line 604b. The hypothetical lines 604a, 604b are intended for descriptive purposes of the enclosure 602. The first hypothetical line 604a intersects the midpoint of the third wall 602c and the midpoint of the fourth wall 602d. The first hypothetical line 604a is parallel to the first wall 602a and the second wall 602b. The second hypothetical line 604b intersects the midpoint of the first wall 602a and the midpoint of the second wall 602b. The second hypothetical line 604b is parallel to the third wall 602c and the fourth wall 602d.

The enclosure 602 of the tape embedded drive 600 further comprises a plurality of feedthrough connectors 606a, 606b, 606c, 606d, a first tape spindle motor 608a coupled with a first rotational sensor 610a, a second tape spindle motor 608b coupled with a second rotational sensor 610b, and a head assembly 612. The rotational sensors 610a, 610b determines the speed of the tape spindle motors 608a, 608b, so that the tape spindle motors 608a, 608b are rotating at the same speed. The number of feedthrough connectors illustrated is not intended to be limiting, as more than or less than the currently illustrated number of feedthrough connectors may be valid in other embodiments of the tape embedded drive.

The head assembly 612 comprises a read/write head bar 614 comprising a plurality of read heads and a plurality of write heads, and a head positioning motor 616 coupled with one or more sensors 618. The one or more sensors 618 of the head positioning motor 616 aids in determining where the head assembly 612 should be in relation to the tape media, such as the tape media 115 of FIGS. 1A & 1B. The rotational sensors 610a, 610b working in conjunction with the one or more sensors 618 of the head positioning motor 616 may allow for read/write operations to occur in the appropriate position on the tape film or tape media.

A first feedthrough connector 606a is centered about the first hypothetical line 604a, where one of the two longer sides of the first feedthrough connector 606a is next to the third wall 602c and the first feedthrough connector 606a is adjacent to the third wall 602c. The second feedthrough connector 606b is positioned adjacent to the first wall 602a and between the fourth wall 602d and the second hypothetical line 604b, where one of the two longer sides is next to the first wall 602a. The third feedthrough connector 606c is positioned on the opposite side of the enclosure 602 relative to the second feedthrough connector 606b. Furthermore, the third feedthrough connector 606c is between the second hypothetical line 604b and the fourth wall 602d, where one of the two longer sides of the third feedthrough connector 606c is next to the second wall 602b. In one embodiment, the second feedthrough connector 606b and the third feedthrough connector 606c are equidistant from the first hypothetical line 604a. The fourth feedthrough connector 606d is centered about the first hypothetical line 604a next to the fourth wall 602d, where one of the two longer sides is next to the fourth wall 602d. In one embodiment, the first feedthrough connector 606a and the fourth feedthrough connector 606d are equidistant from the second hypothetical line 604b. The location of the feedthrough connectors illustrated is not intended to be limiting, but to provide an example of a possible embodiment. Furthermore, one or more feedthrough connectors may be symmetrically placed about the first hypothetical line 604a and/or the second hypothetical line 604b.

Furthermore, the first feedthrough connector 606a is spaced a first distance from the third wall 602c and a second distance from the fourth wall 602d, where the first distance is less than the second distance. The second feedthrough connector 606b is spaced a third distance from the fourth wall 602d, wherein the third distance is greater than the first distance, but less than the second distance. The first feedthrough connector 606a is spaced a fourth distance from the head assembly 612 and the second feedthrough connector 606b is spaced a fifth distance from the head assembly 612. In one embodiment, the fourth distance is greater than the fifth distance.

The first tape spindle motor 608a and the second tape spindle motor 608b are positioned about the same level and are parallel to the second hypothetical line 604b. The tape spindle motors 608a, 608b between the second hypothetical line 604b and the third wall 602c, where the first tape spindle motor 608a is between the first wall 602a and the first hypothetical line 604a and the second tape spindle motor 608b is between the second wall 602b and the first hypothetical line 604a. The tape spindle motors 608a, 608b may be positioned such that each tape reel (not shown) can rotate without interference (i.e., does not collide with) with any other component of the tape embedded drive. Furthermore, the head assembly 612 is centered about the first hypothetical line 604a and between the second hypothetical line 604b and the fourth wall 602d.

Figure 7:
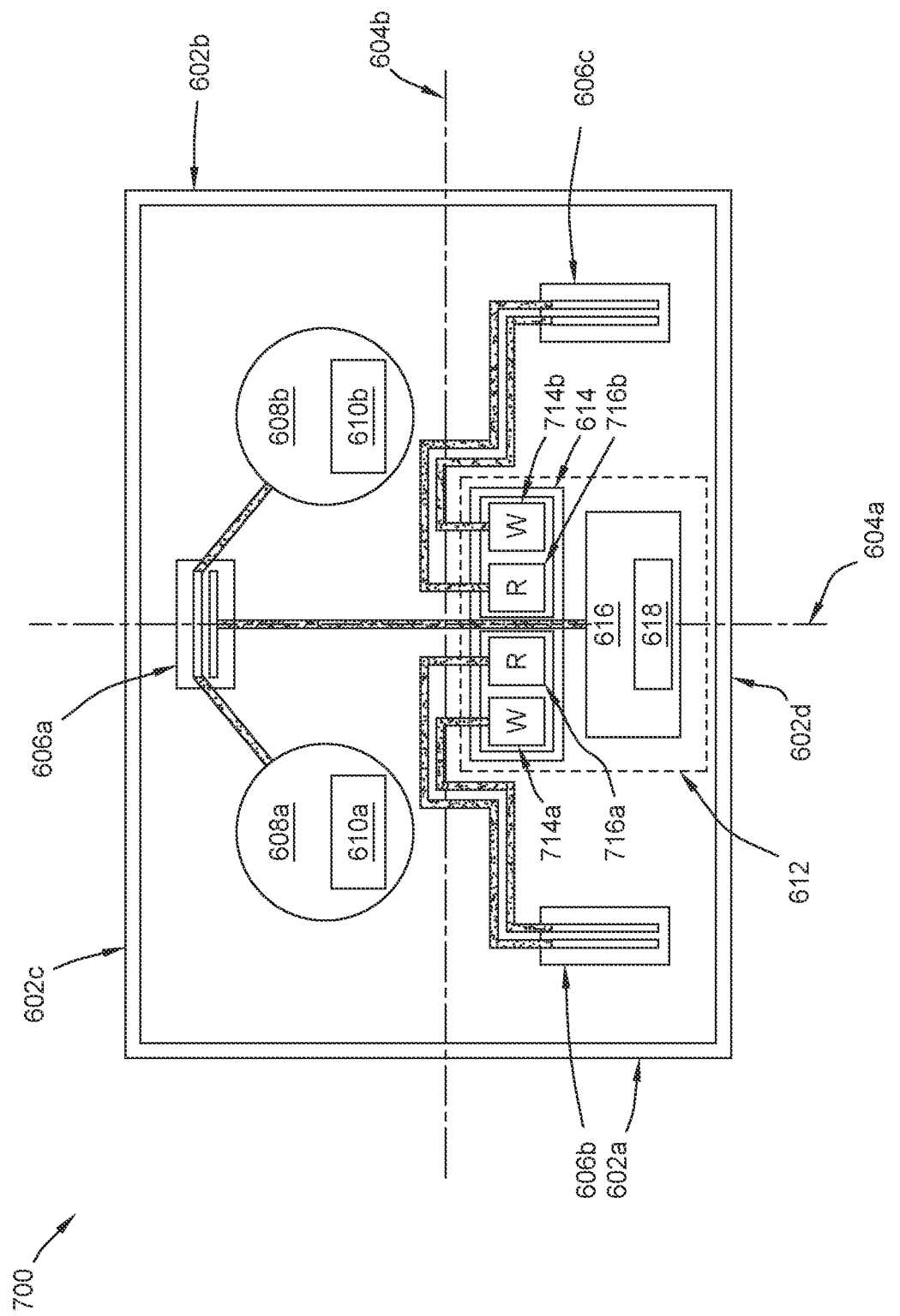
FIG. 7 is a schematic illustration of a tape embedded drive having a plurality of feedthrough connectors according to another embodiment.

FIG. 7 is a schematic illustration of a tape embedded drive 700 having a plurality of feedthrough connectors according to another embodiment. Aspects of FIG. 6 may be similar to those illustrated in FIG. 7. The tape embedded drive 700 comprises a first feedthrough connector 606a, a second feedthrough connector 606b, and a third feedthrough connector 606c, where each of the feedthrough connectors 606a, 606b, 606c is in the same position described in FIG. 6. The read/write head bar 614 comprises a first write head 714a, a first read head 716a, a second read head 716b, and a second write head 714b, where the configuration of the read/write head bar 614 may be described as WR-RW (i.e., writeread-readwrite). The first write head 714a and the first read head 716a are positioned in the portion of the head assembly 612 that is between the first hypothetical line 604a and the first wall 602a. The second write head 714b and the second read head 716b are positioned in the portion of the head assembly 612 that is between the first hypothetical line 604a and the second wall 602b.

The tape embedded drive 700 comprises circuitry connecting the feedthrough connectors 606a, 606b, 606c to various components of the tape embedded drive 700. For example, individual circuitry (i.e., unique wiring to each component) connects the first spindle motor 608a, the second spindle motor 608b, and the head positioning motor 616 to the first feedthrough connector 606a. In one embodiment, the circuitry from the first feedthrough connector 606a to the head positioning motor 616 runs underneath the read/write head bar 614. Circuitry couples the second feedthrough connector 606b to the first write head 714a and the first read head 716a. The circuitry may run along the second hypothetical line 604b and between the first wall 602a and the first hypothetical line 604a. Circuitry further couples the third feedthrough connector 606c to the second read head 716b and the second write head 714b. The circuitry may run along the second hypothetical line 604b and between the second wall 602b and the first hypothetical line 604a.

Figure 8:
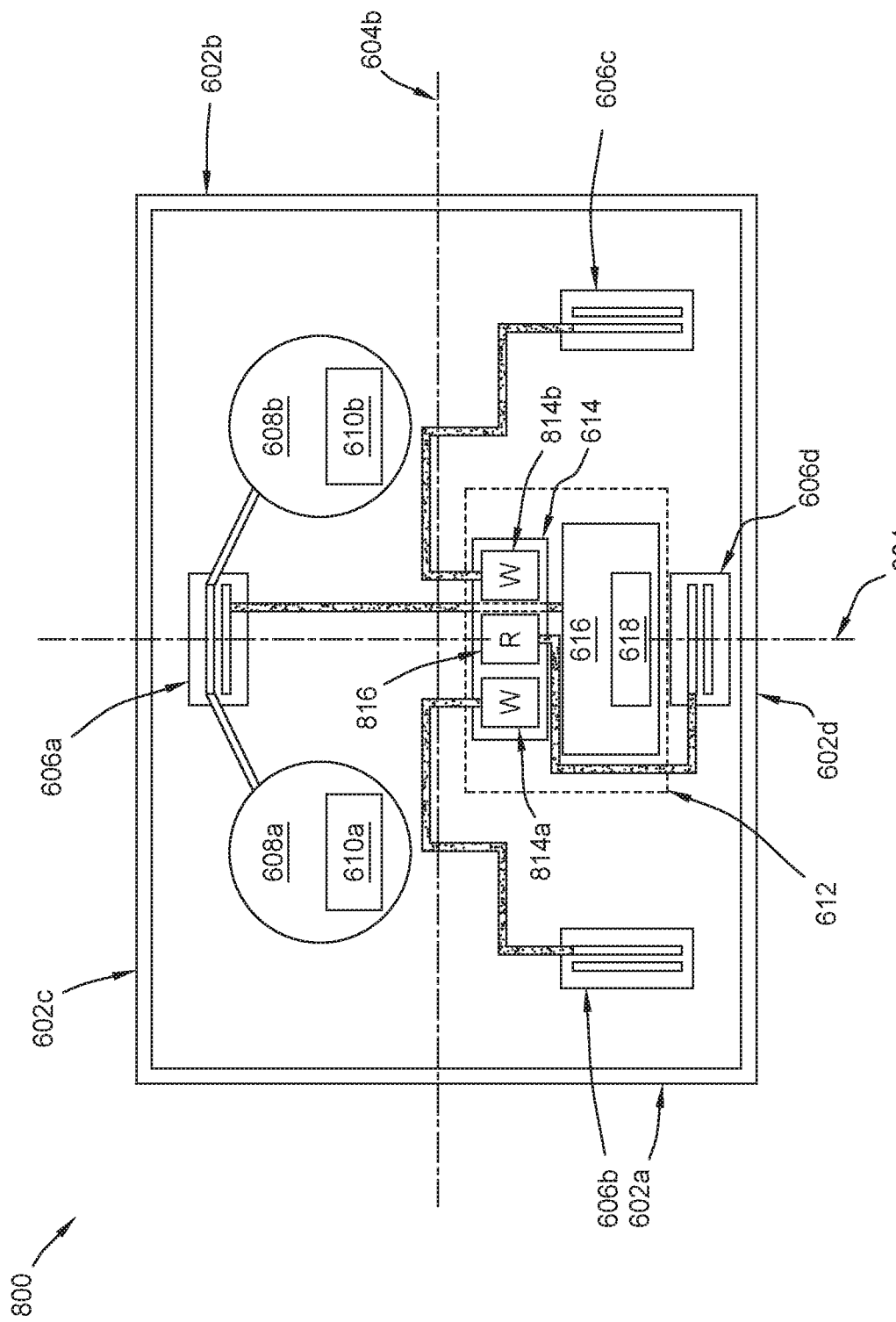
FIG. 8 is a schematic illustration of a tape embedded drive having a plurality of feedthrough connectors according to another embodiment.

FIG. 8 is a schematic illustration of a tape embedded drive 800 having a plurality of feedthrough connectors according to another embodiment. Aspects of FIG. 6 may be similar to those illustrated in FIG. 8. The tape embedded drive 800 comprises a first feedthrough connector 606a, a second feedthrough connector 606b, a third feedthrough connector 606c, and a fourth feedthrough connector 606d, where each of the feedthrough connectors 606a, 606b, 606c, 606d is in the same position described in FIG. 6. The read/write head bar 614 comprises a first write head 814a, a read head 816, and a second write head 814b, where the configuration of the read/write head bar 614 may be described as WRW (i.e., writereadwrite). The first write head 814a is positioned in the portion of the head assembly 612 that is between the first hypothetical line 604a and the first wall 602a. The second write head 814b is positioned in the portion of the head assembly 612 that is between the first hypothetical line 604a and the second wall 602b. The read head 816 is centered in the portion of the head assembly 612 about the first hypothetical line 604a.

The tape embedded drive 800 comprises circuitry connecting the feedthrough connectors 606a, 606b, 606c, 606d to various components of the tape embedded drive 800. For example, individual circuitry (i.e., unique wiring to each component) connects the first spindle motor 608a, the second spindle motor 608b, and the head positioning motor 616 to the first feedthrough connector 606a. In one embodiment, the circuitry from the first feedthrough connector 606a to the head positioning motor 616 runs underneath the read/write head bar 614. Circuitry couples the second feedthrough connector 606b to the first write head 814a. The circuitry may run along the second hypothetical line 604b and between the first wall 602a and the first hypothetical line 604a. Circuitry further couples the third feedthrough connector 606c to the second write head 814b. The circuitry may run along the second hypothetical line 604b and between the second wall 602b and the first hypothetical line 604a. Circuitry also couples the read head 816 to the fourth feedthrough connector 606d, wherein the circuitry may be wired around, above, or under the head assembly 612.

Figure 9:
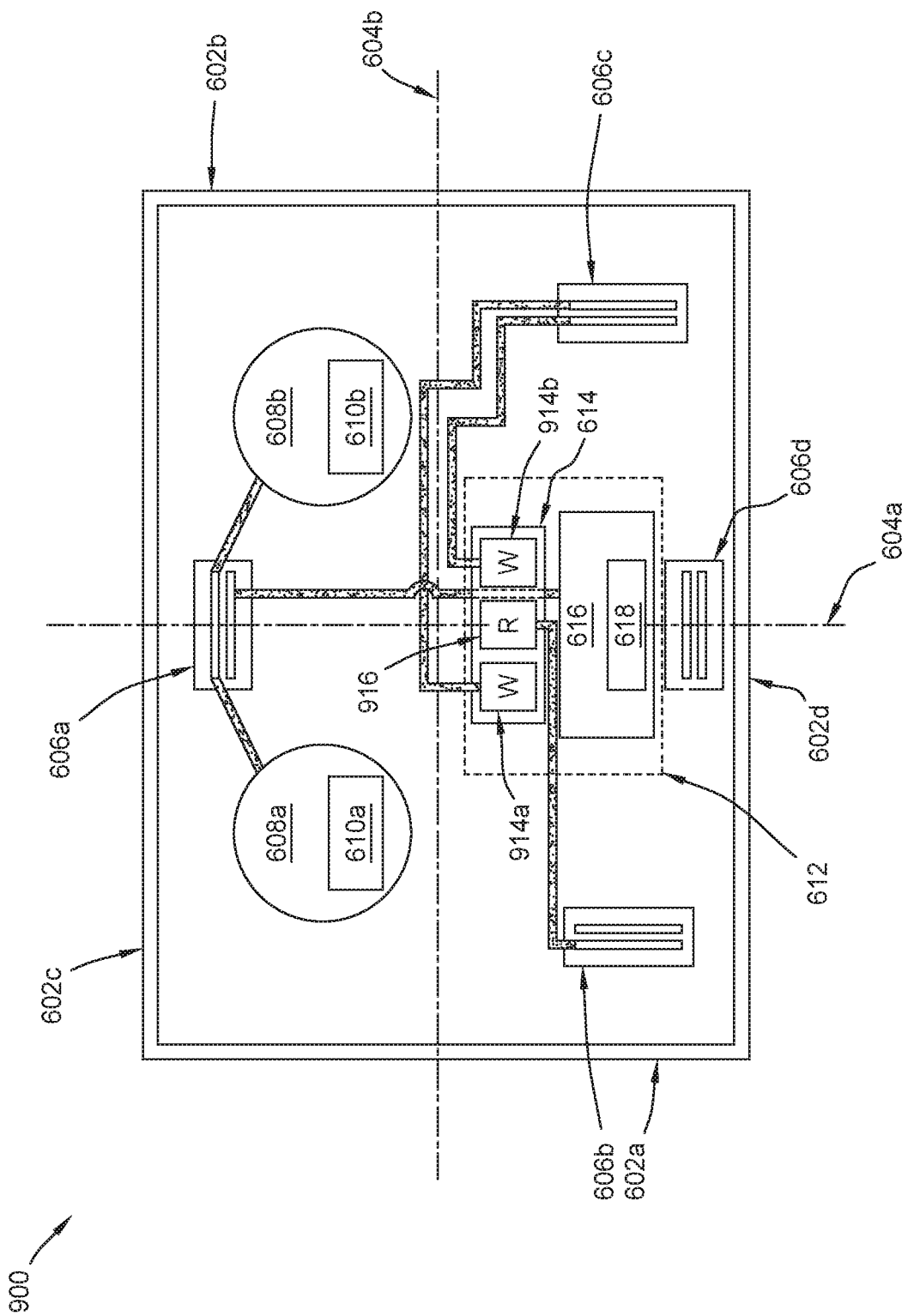
FIG. 9 is a schematic illustration of a tape embedded drive having a plurality of feedthrough connectors according to another embodiment.

FIG. 9 is a schematic illustration of a tape embedded drive 900 having a plurality of feedthrough connectors according to another embodiment. Aspects of FIG. 6 may be similar to those illustrated in FIG. 9. The tape embedded drive 900 comprises a first feedthrough connector 606a, a second feedthrough connector 606b, and a third feedthrough connector 606c, where each of the feedthrough connectors 606a, 606b, 606c is in the same position described in FIG. 6. The read/write head bar 614 comprises a first write head 914a, a read head 916, and a second write head 914b, where the configuration of the read/write head bar 614 may be described as WRW (i.e., writereadwrite). The first write head 914a is positioned in the portion of the head assembly 612 that is between the first hypothetical line 604a and the first wall 602a. The second write head 914b is positioned in the portion of the head assembly 612 that is between the first hypothetical line 604a and the second wall 602b. The read head 916 is centered in the portion of the head assembly 612 about the first hypothetical line 604a.

The tape embedded drive 900 comprises circuitry connecting the feedthrough connectors 606a, 606b, 606c to various components of the tape embedded drive 900. For example, individual circuitry (i.e., unique wiring to each component) connects the first spindle motor 608a, the second spindle motor 608b, and the head positioning motor 616 to the first feedthrough connector 606a. In one embodiment, the circuitry from the first feedthrough connector 606a to the head positioning motor 616 runs underneath the read/write head bar 614. Circuitry couples the second feedthrough connector 606b to the read head 916. The circuitry may run along the first hypothetical line 604a and between the fourth wall 602d and the second hypothetical line 604b. Circuitry further couples the third feedthrough connector 606c to the first write head 914a and the second write head 914b. The circuitry may run along the second hypothetical line 604b and between the first wall 602a and the second wall 602b.

FIG. 10 is a schematic illustration of a tape embedded drive 1000 having a plurality of feedthrough connectors according to another embodiment. Aspects of FIG. 6 may be similar to those illustrated in FIG. 10. The tape embedded drive 1000 comprises a first feedthrough connector 606a, a second feedthrough connector 606b, and a third feedthrough connector 606c, where each of the feedthrough connectors 606a, 606b, 606c is in the same position described in FIG. 6. The read/write head bar 614 comprises a first write head 1014a, a read head 1016, and a second write head 1014b, where the configuration of the read/write head bar 614 may be described as WRW (i.e., writereadwrite). The first write head 1014a is positioned in the portion of the head assembly 612 that is between the first hypothetical line 604a and the first wall 602a. The second write head 1014b is positioned in the portion of the head assembly 612 that is between the first hypothetical line 604a and the second wall 602b. The read head 1016 is centered in the portion of the head assembly 612 about the first hypothetical line 604a.

The tape embedded drive 1000 comprises circuitry connecting the feedthrough connectors 606a, 606b, 606c to various components of the tape embedded drive 1000. For example, individual circuitry (i.e., unique wiring to each component) connects the first spindle motor 608a, the second spindle motor 608b, and the head positioning motor 616 to the first feedthrough connector 606a. In one embodiment, the circuitry from the first feedthrough connector 606a to the head positioning motor 616 runs underneath the read/write head bar 614. Circuitry couples the second feedthrough connector 606b to the first write head 1014a and the read head 1016. The circuitry may run between the first wall 602a and the first hypothetical line 604 and between the fourth wall 602d and the second hypothetical line 604b. Circuitry further couples the third feedthrough connector 606c to the second write head 914b. The circuitry may run along the second hypothetical line 604b and between the second wall 602b and the first hypothetical line 604a. In another embodiment, the circuitry may connect the third feedthrough connector 606c to the read head 1016 and the second write head 1014b, where another set of circuitry connects the second feedthrough connector 606b to the first write head 1014a.

By using a symmetrical layout for feedthrough connectors in a tape embedded drive, interference with tape guide rollers can be avoided, the mass balance of the drive becomes more symmetric, the drive becomes more mechanically stable, the device is more cost effective to manufacture, and the enclosure for the drive is more tightly sealed.

In one embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure; and a plurality of feedthrough connectors coupled to the bottom surface, wherein the plurality of feedthrough connectors are symmetrically arranged around a hypothetical centerline that is parallel to the first wall and the second wall. The plurality of feedthrough connectors comprises three feedthrough connectors. The plurality of feedthrough connectors comprises four feedthrough connectors. At least two feedthrough connectors are centered on the hypothetical centerline. Two feedthrough connectors are spaced from the hypothetical centerline. A first feedthrough connector of the plurality of feedthrough connectors is spaced a first distance from the third wall, wherein a second feedthrough connector of the plurality of feedthrough connectors is spaced a second distance from the fourth wall, and wherein the first distance is greater than the second distance. A first feedthrough connector of the plurality of feedthrough connectors is spaced a first distance from the tape head, wherein a second feedthrough connector of the plurality of feedthrough connectors is spaced a second distance from the tape head, and wherein the first distance is greater than the second distance. The enclosure is a sealed enclosure.

In another embodiment, a storage device comprises: an enclosure having a first wall, a second wall, a third wall between the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure; a first feedthrough connector coupled to the bottom surface, wherein the first feedthrough connector is centered on a hypothetical centerline that is parallel to the first wall and the second wall; a second feedthrough connector coupled to the bottom surface, wherein the second feedthrough connector is spaced from the hypothetical centerline; and a third feedthrough connector coupled to the bottom surface, wherein the third feedthrough connector is spaced from the hypothetical centerline. The first feedthrough connector is coupled to the first spindle motor and the second spindle motor. The second feedthrough connector is coupled to the tape head. The third feedthrough connector is coupled to the tape head. The enclosure is a sealed enclosure.

In another embodiment, a storage device comprises: an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall; a first spindle motor disposed within the enclosure and coupled to the bottom surface; a second spindle motor disposed within the enclosure and coupled to the bottom surface; a tape head disposed within the enclosure, the tape head comprising a beam, a first write head bar, a read bar, and a second write head bar; head positioning motors coupled to the tape head; a first feedthrough connector coupled to the bottom surface and the head positioning motors, wherein the first feedthrough connector is centered on a hypothetical centerline that is parallel to the first wall and the second wall; a second feedthrough connector coupled to the bottom surface and either the first write head bar or the second write head bar; and a third feedthrough connector coupled to the bottom surface and either the first write head bar or the second write head bar. The first feedthrough connector is coupled to the head positioning motors, the first spindle motor, and the second spindle motor. The read bar comprises a first read head bar and a second read head bar, wherein the second feedthrough connector is coupled to the first write head bar and the first read head bar. The third feedthrough connector is coupled to the second write head bar and the second read head bar. The storage device further comprises a fourth feedthrough connector, wherein the fourth feedthrough connector is centered on the hypothetical centerline. The second feedthrough connector is coupled to the first write head bar, the third feedthrough connector is coupled to the second write head bar. The fourth feedthrough connector is coupled to the read bar. The second feedthrough connector is coupled to the read bar and wherein the third feedthrough connector is coupled to the first write head bar and the second write head bar. The second feedthrough connector is coupled to the first write head bar and the read bar and wherein the third feedthrough connector is coupled to the second write head bar.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall;
a first spindle motor disposed within the enclosure and coupled to the bottom surface;
a second spindle motor disposed within the enclosure and coupled to the bottom surface;
a tape head disposed within the enclosure; and
a plurality of feedthrough connectors coupled to the bottom surface, wherein the plurality of feedthrough connectors are symmetrically arranged around a hypothetical centerline that is parallel to the first wall and the second wall.

2. The storage device of claim 1, wherein the plurality of feedthrough connectors comprises three feedthrough connectors.

3. The storage device of claim 1, wherein the plurality of feedthrough connectors comprises four feedthrough connectors.

4. The storage device of claim 3, wherein at least two feedthrough connectors are centered on the hypothetical centerline.

5. The storage device of claim 4, wherein two feedthrough connectors are spaced from the hypothetical centerline.

6. The storage device of claim 1, wherein a first feedthrough connector of the plurality of feedthrough connectors is spaced a first distance from the third wall, wherein a second feedthrough connector of the plurality of feedthrough connectors is spaced a second distance from the fourth wall, and wherein the first distance is greater than the second distance.

7. The storage device of claim 1, wherein a first feedthrough connector of the plurality of feedthrough connectors is spaced a first distance from the tape head, wherein a second feedthrough connector of the plurality of feedthrough connectors is spaced a second distance from the tape head, and wherein the first distance is greater than the second distance.

8. The storage device of claim 1, wherein the enclosure is a sealed enclosure.

9. A storage device, comprising:
an enclosure having a first wall, a second wall, a third wall between the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall;

a first spindle motor disposed within the enclosure and coupled to the bottom surface;

a second spindle motor disposed within the enclosure and coupled to the bottom surface;

a tape head disposed within the enclosure;

a first feedthrough connector coupled to the bottom surface, wherein the first feedthrough connector is centered on a hypothetical centerline that is parallel to the first wall and the second wall;

a second feedthrough connector coupled to the bottom surface, wherein the second feedthrough connector is spaced from the hypothetical centerline; and a third feedthrough connector coupled to the bottom surface, wherein the third feedthrough connector is spaced from the hypothetical centerline.

10. The storage device of claim 9, wherein the first feedthrough connector is coupled to the first spindle motor and the second spindle motor.

11. The storage device of claim 10, wherein the second feedthrough connector is coupled to the tape head.

12. The storage device of claim 11, wherein the third feedthrough connector is coupled to the tape head.

13. The storage device of claim 9, wherein the enclosure is a sealed enclosure.

14. A storage device, comprising:
an enclosure having a first wall, a second wall, a third wall connecting the first wall and the second wall, a fourth wall connecting the first wall and the second wall, and a bottom surface coupled to the first wall, the second wall, the third wall, and the fourth wall, wherein the first wall and the second wall are parallel, wherein the third wall and the fourth wall are parallel, wherein the first wall and the second wall are of substantially equal length, wherein the third wall and the fourth wall are of substantially equal length, and wherein the third wall is longer than the first wall;

a first spindle motor disposed within the enclosure and coupled to the bottom surface;

a second spindle motor disposed within the enclosure and coupled to the bottom surface;

a tape head disposed within the enclosure, the tape head comprising a beam, a first write head bar, a read bar, and a second write head bar;

head positioning motors coupled to the tape head;

a first feedthrough connector coupled to the bottom surface and the head positioning motors, wherein the first feedthrough connector is centered on a hypothetical centerline that is parallel to the first wall and the second wall;

a second feedthrough connector coupled to the bottom surface and either the first write head bar or the second write head bar; and a third feedthrough connector coupled to the bottom surface and either the first write head bar or the second write head bar.

15. The storage device of claim 14, wherein the first feedthrough connector is coupled to the head positioning motors, the first spindle motor, and the second spindle motor.

16. The storage device of claim 15, wherein the read bar comprises a first read head bar and a second read head bar, wherein the second feedthrough connector is coupled to the first write head bar and the first read head bar.

17. The storage device of claim 16, wherein the third feedthrough connector is coupled to the second write head bar and the second read head bar.

18. The storage device of claim 14, further comprising a fourth feedthrough connector, wherein the fourth feedthrough connector is centered on the hypothetical centerline.

19. The storage device of claim 18, wherein the second feedthrough connector is coupled to the first write head bar, the third feedthrough connector is coupled to the second write head bar.

20. The storage device of claim 19, wherein the fourth feedthrough connector is coupled to the read bar.

21. The storage device of claim 15, wherein the second feedthrough connector is coupled to the read bar and wherein the third feedthrough connector is coupled to the second write head bar.

22. The storage device of claim 15, wherein the second feedthrough connector is coupled to the first write head bar and the read bar and wherein the third feedthrough connector is coupled to the second write head bar.

* * * * *